Feb. 7, 1950     H. I. RICHARDSON     2,496,494
FULL STROKE MECHANISM
Filed Jan. 12, 1948
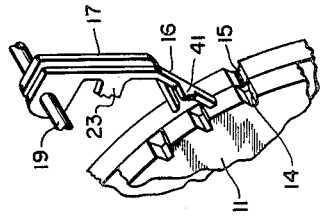
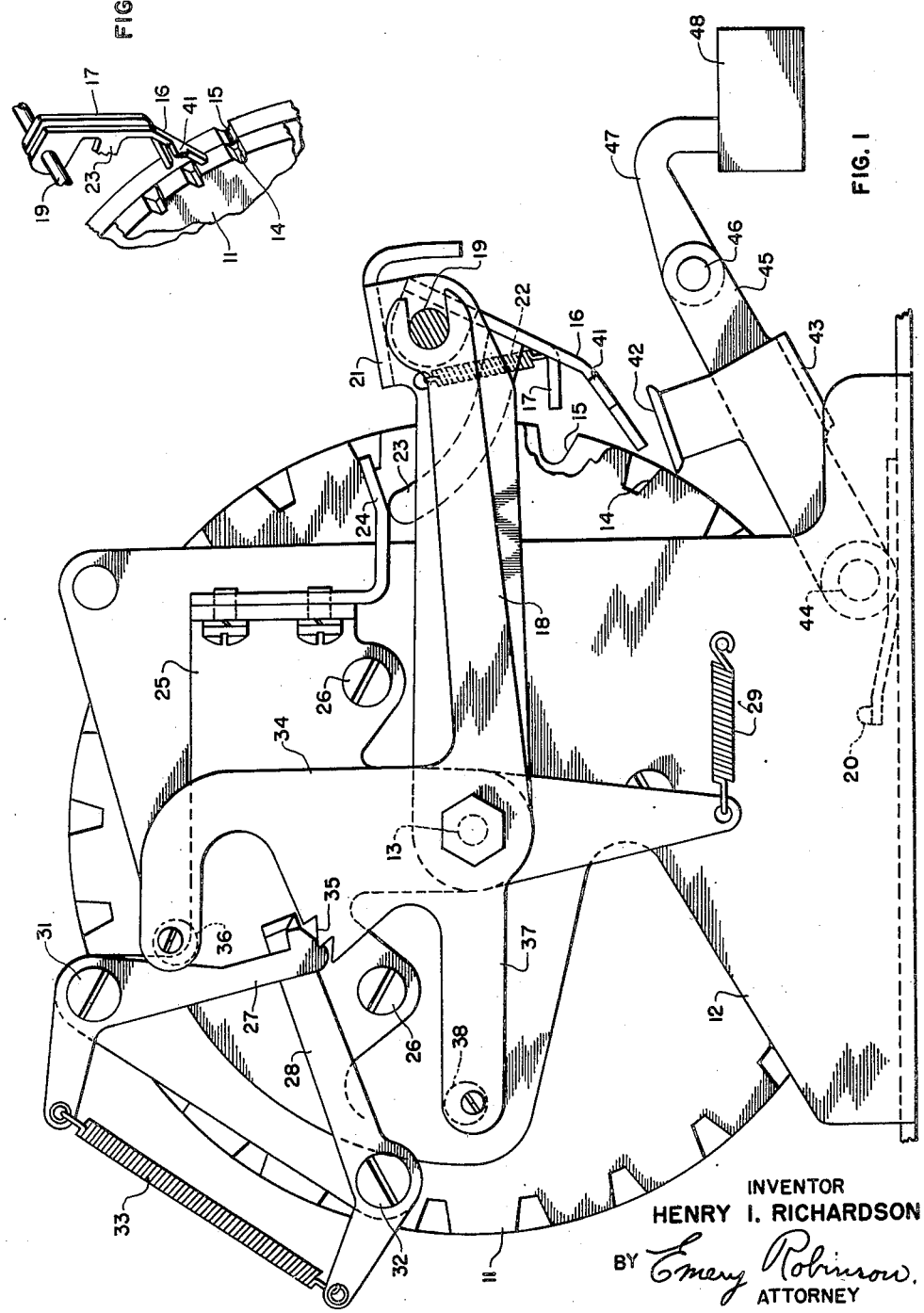
INVENTOR
HENRY I. RICHARDSON
BY *Emery Robinson*
ATTORNEY Patented Feb. 7, 1950

2,496,494

UNITED STATES PATENT OFFICE 2,496,494

FULL STROKE MECHANISM

Henry Ivan Richardson, Elmwood Park, Ill., assignor to Teletype Corporation, Chicago, Ill., a corporation of Delaware Application January 12, 1948, Serial No. 1,770

9 Claims. (Cl. 74—17.5)

This invention relates to wheel setting apparatus and more particularly to wheel setting apparatus wherein each wheel makes one complete revolution before the succeeding wheel is advanced.

In apparatus of this type it has been found that an operator often fails to exert sufficient force to cause the wheel to be advanced a complete step. Also the operator will sometimes depress the wheel advancing means before it has returned completely to its normal position.

Accordingly, it is a primary object of this invention to provide a wheel advancing mechanism wherein the wheel will always be advanced a complete step before the wheel advancing means can be returned to normal position.

Another object of this invention is to provide a wheel advancing mechanism wherein the wheel advancing means will be inoperative to advance the wheel a second step until it has first returned to normal position.

Other objects and advantages of this invention will be apparent from the following description when read in conjunction with the appended drawing, in which:

Fig. 1 is a front elevation view showing the features of the invention; and

Fig. 2 is a detail fragmentary perspective view of a wheel and the wheel stepping pawls.

In the drawing a plurality of wheels 11, only one of which is shown, are rotatably supported in a pair of brackets 12 by a shaft 13. Each wheel 11 is provided with a plurality of stepping teeth 14 equally spaced around the periphery thereof, and at least one detecting notch 15. A pawl 16 and a detecting lever or pawl 17 cooperate respectively with the stepping teeth 14 and detecting notch 15 to advance each wheel 11. A detent 20 engages one of the teeth 14 in each wheel to hold it in its stepped position. The stepping of the wheel 11 is accomplished in a well known manner such that an adjacent wheel will not be stepped until a first wheel has made a complete revolution. The pawl 16 which cooperates with an adjacent wheel 11 engages one of its corresponding stepping teeth 14 only when the pawl 17 corresponding to the first wheel engages the detecting notch 15. Each succeeding pawl is dependent for operation on the immediately preceding pawl.

A bail 21 mounted pivotally on either end of the shaft 13 is biased in a counterclockwise direction by a spring 29 and carries a shaft 19 which supports pivotally all of the pawls 16 and 17. A seating lever 18 is also mounted pivotally on the shaft 13 and moves with the bail 21. The bail 21 carries a set of springs 22 for biasing the pawls 16 and 17 in a clockwise direction. The pawls 16 and 17 are prevented from engaging the teeth or notches in the wheel when the seating lever 18 and bail 21 are in normal position (the position shown in Fig. 1) by an arm 23 on the first pawl 16 which engages a stop 24. Depression of the bail 21 causes the shaft 19 to be moved downwardly which causes the withdrawal of the arm 23 from the stop 24 which in turn allows the springs 22 to tend to draw the pawls 16 and 17 into engagement with the wheels 11.

A bracket 25 is secured to the bracket 12 by screws 26 and fixedly supports the afore-mentioned stop 24. A latch 27 and a pawl 28 are mounted pivotally on the bracket 25 by a pair of bolts 31 and 32 respectively and are biased for mutual cooperation by a spring 33.

The seating lever 18 has a vertical arm 34 which is provided with a ratchet or toothed portion 35 for cooperation with the pawl 28 and which is also provided with an eccentrically adjustable pin 36 for cooperation with the latch 27. A horizontal arm 37 on the seating lever 18 is provided with an eccentrically adjustable pin 38 which cooperates with the pawl 28.

In the normal rest position of the seating lever 18, the latch 27 and pawl 28 are in the positions shown in Fig. 1. Depression of the bail 21 causes the seating lever 18 to pivot clockwise about the shaft 13 which in turn causes the pawl 28 to slip over the toothed portion 35. If the bail 21 is not completely depressed the pawl 28 will engage one of the teeth in the toothed portion 35 which will prevent the bail 21 and seating lever 18 from returning to normal position. If the bail 21 is depressed sufficiently to step the wheel 11 one complete step, the pawl 28 will have slipped over the entire toothed portion 35 and the pin 38 will have engaged the pawl 28 to pivot the pawl 28 in a counterclockwise direction against the action of the spring 33 until it is latched from engagement with the toothed portion 35 by the latch 27 under urging of the spring 33. Thereafter the seating lever 18 and bail 21 will be returned to normal position by the spring 29 whereupon the pin 36 will engage the latch 27 thus forcing the disengagement of latch 27 from the pawl 28 which returns the pawl 28 and latch 27 to normal position in readiness for a second stepping operation.

The pawl 16 is provided with a sidewardly extending lug 41 which cooperates with the top of a double faced cam plate 42 integral with a lever 43 pivoted at 44. The lever 43 is continuously urged in a counterclockwise direction about pivot 44 by a spring (not shown). The association between the lug 41 and the cam plate 42 is such that when the pawl 16 is urged downwardly the cam plate 42 will urge the pawl into engagement with the stepping tooth 14, and thereafter as the pawl is further depressed the lug 41 will cam the cam plate 42 and the lever 43 clockwise about pivot point 44 until the lug slips past the cam plate, after which the cam plate moves back to its normal position. As the lever 43 is pivoted clockwise around pivot 44 it moves a lever 45 also pivoted at 44. Mounted pivotally at 46 on the opposite end of the lever 45 is a lever 47 which is connected to a counter mechanism 48, which is actuated for each reciprocation of the lever 47. The counter mechanism 48 may be of any standard commercial type, of which many are available for counting each step of the wheel 11 by lever operation.

On the return stroke of the pawl 16, the cam plate 42 having returned to its normal position, the lug 41 will be beneath the cam plate 42 and therefore the pawl 16 will be pivoted counterclockwise away from engagement with the wheel 11.

At the point in the depression of the bail 21 that lug 41 slips off the cam plate 42, the wheel 11 has been completely stepped and also at this point the movement of the lever 47 has been such that the counter mechanism 48 is completely actuated. It should now be apparent that the pin 38 lifts the pawl 28 into latching engagement with the latch 27 at the same time that the lug 41 slips off the cam plate 42 for, as has already been mentioned, both of these operations take place upon the completion of a full stepping of the wheel 11.

By this invention there is provided an efficient full stroke mechanism for advancing a set of wheels in a stepped manner wherein any partial stepping of the wheels may be immediately detected due to the fact that the stepping mechanism will not be returned to normal position until there has been a completed step.

It is contemplated that various modifications and changes may be made in this invention without departing from the spirit thereof.

What is claimed is:

1. In a wheel stepping mechanism, a depressible bail, a pawl supported pivotally on said bail adapted for engaging a tooth on a wheel to step said wheel when said bail is depressed, a lug on said pawl, a pivotally mounted cam plate for engaging said lug when the bail is depressed to force the pawl into engagement with said wheel, said lug being adapted to override said cam plate whereby the cam plate is pivoted, a counter mechanism, and a pivoted lever operable when said cam plate is pivoted to actuate said counter mechanism.

2. In a wheel stepping mechanism, a depressible bail, a pawl supported pivotally on said bail adapted for engaging a tooth on a wheel, a lug on said pawl, and a cam for cooperating with said lug to force said pawl into engagement with said wheel when said bail is depressed, whereby said wheel will be stepped.

3. In a wheel stepping mechanism, a depressible bail, a pawl supported pivotally on said bail and adapted for engaging a tooth on a wheel to step said wheel when said bail is depressed, a lug on said pawl, a pivotally mounted cam plate for cooperating with said lug to control the pivotal movement of said pawl, said lug being adapted to engage one face of said cam plate when said bail is depressed whereby said pawl is cammed into engagement with said wheel, said cam plate being adapted to be pivoted momentarily from its normal position by said lug to allow said lug to override said cam plate, and a second face on said cam plate operable after said lug has overridden said cam plate and adapted to be engaged by said lug to prevent said pawl from engaging the wheel during the return stroke of said pawl.

4. In a wheel stepping mechanism, a depressible bail, a pawl supported pivotally on said bail adapted for engaging a tooth on a wheel to step said wheel when said bail is depressed, a lug on said pawl, a pivotally mounted cam plate for cooperating with said lug to control the pivotal movement of said pawl, said lug being adapted to engage one face of said cam plate when said bail is depressed whereby the pawl is cammed into engagement with said wheel, said cam plate being adapted to be pivoted momentarily from its normal position by said lug to allow said lug to override said cam plate, a second face of said double faced cam plate being operable after said cam plate has been pivoted momentarily to engage said lug and prevent said pawl from engaging the wheel during the return stroke of said pawl, and a pivoted lever operable when said cam plate is pivoted to actuate a counter mechanism.

5. In a wheel stepping mechanism, a depressible bail, a pawl supported pivotally on said bail and adapted for engaging a tooth on a wheel to step said wheel when said bail is depressed, a lever associated with said bail and pivotal therewith, said lever having a toothed portion thereon, a pawl cooperable with said toothed portion on said lever for preventing said lever and bail from returning to undepressed position, and a pin on said lever for disengaging said second mentioned pawl from said toothed portion when the wheel has been advanced a complete step.

6. In a wheel stepping mechanism, a depressible bail, means for returning said bail to undepressed position, means associated with said bail for engaging and stepping a wheel, a lever associated with said bail and pivotal therewith upon the depression of said bail, said lever having a ratchet thereon, a pawl cooperable with said ratchet for preventing said lever and bail from returning to undepressed position, a pin on said lever for disengaging said pawl from said ratchet when the wheel has been advanced a complete step, a latch for engaging said pawl upon disengagement from said ratchet to allow said bail to return to undepressed position, and a second pin on said lever operable upon the return of said bail to normal position for disengaging said latch from said pawl.

7. In a wheel stepping mechanism, a manually operable member, means for returning said member to normal position after having been operated manually, means associated with said manually operable member for stepping a wheel, a lever associated with said manually operable member and operable therewith, said lever having a toothed portion thereon, a pawl cooperable with said toothed portion for preventing said lever and said manually operable member from returning to normal position, a latch, means on said lever operable when said wheel has been advanced a complete step for moving said pawl into inoperative position, whereby the pawl is retained in inoperative position by said latch while said lever and said manually operable member return to normal position, and a second means on said lever operable upon the return of said lever and said manually operable member to normal position for engaging said latch to allow said pawl to return to operative position.

8. In a wheel stepping mechanism, a depressible bail, a pawl supported pivotally on said bail adapted for engaging a tooth on a wheel to step said wheel when said bail is depressed, a lug on said pawl, a pivotally mounted cam plate for engaging said lug when the bail is depressed to force the pawl into engagement with said wheel, said lug being adapted to override said cam plate whereby the cam plate is pivoted, a counter mechanism, a pivoted lever operable when said cam plate is pivoted to actuate said counter mechanism, a pivotally mounted member associated with said bail and movable therewith, said member having a toothed portion thereon, a pawl cooperable with said toothed portion for preventing said member and bail from returning to undepressed position, a pin on said member for disengaging said second-mentioned pawl from said toothed portion when the wheel has been advanced a complete step, a latch for engaging said second-mentioned pawl upon disengagement thereof from said toothed portion to allow said bail and member to return to undepressed position, and a second pin on said member operable upon the return of said bail and member to undepressed position for disengaging said latch from said second mentioned pawl.

9. In a wheel stepping mechanism, a depressible bail, a pawl supported pivotally on said bail adapted for engaging a tooth on a wheel to step said wheel when said bail is depressed, a lug on said pawl, a pivotally mounted cam plate for cooperating with said lug to control the pivotal movement of said pawl, said lug being adapted to engage one face of said cam plate when said bail is depressed whereby the pawl is cammed into engagement with said wheel, said cam plate being adapted to be pivoted momentarily from its normal position by said lug to allow said lug to override said cam plate, a counter mechanism, a pivoted lever operable when said cam plate is pivoted momentarily for actuating said counter mechanism, a second face on said cam plate operable after said lug has overridden said cam plate and adapted to be engaged by said lug to prevent said pawl from engaging the wheel during the return of said pawl, a lever associated with said bail and movable therewith, said second-mentioned lever having a ratchet thereon, a pawl cooperable with said ratchet for preventing said bail from returning to undepressed position, a pin on said second-mentioned lever for disengaging said second-mentioned pawl from said ratchet when the wheel has been advanced a complete step, a latch for engaging said second-mentioned pawl upon disengagement from said ratchet to allow said bail and the first-mentioned pawl to return to undepressed position, and a second pin on said second-mentioned lever operable upon the return of said bail and first-mentioned pawl to undepressed position for disengaging said latch from said second-mentioned pawl.

HENRY IVAN RICHARDSON.

REFERENCES CITED

The following references are of record in the file of this patent:

UNITED STATES PATENTS

| Number | Name | Date |
|---|---|---|
| 445,672 | Grimes | Feb. 3, 1891 |
| 454,972 | Lord | June 30, 1891 |
| 688,656 | Lester | Dec. 10, 1901 |
| 977,190 | Hopkins | Nov. 29, 1910 |